(12) United States Patent
Yang et al.

(10) Patent No.: US 9,358,994 B1
(45) Date of Patent: Jun. 7, 2016

(54) FOLDING HAND TRUCK

(71) Applicant: GREAT TAIWAN MATERIAL HANDLING CO., Taichung (TW)

(72) Inventors: Cheng-Chiang Yang, Taichung (TW); Shih-Chiang Wang, Taichung (TW)

(73) Assignee: Great Taiwan Material Handling Co., Taichung (TW)

( * ) Notice: Subject to any disclaimer, the term of this patent is extended or adjusted under 35 U.S.C. 154(b) by 0 days.

(21) Appl. No.: 14/621,424

(22) Filed: Feb. 13, 2015

(51) Int. Cl.
*B62B 1/12* (2006.01)

(52) U.S. Cl.
CPC .......................................... *B62B 1/12* (2013.01)

(58) Field of Classification Search
CPC .............. B62B 1/12; B62B 1/002; B62B 1/04
See application file for complete search history.

(56) References Cited

U.S. PATENT DOCUMENTS

| | | | | |
|---|---|---|---|---|
| 1,627,253 A * | 5/1927 | Shannon, Jr. | ............. | B62B 1/12 280/47.29 |
| 2,450,304 A * | 9/1948 | Shiflet | ....................... | B62B 1/12 280/15 |
| 2,806,708 A * | 9/1957 | Finstad | ..................... | B62B 1/12 280/47.27 |
| 3,172,680 A * | 3/1965 | Hire | .......................... | B62B 1/12 280/655 |
| 3,177,000 A * | 4/1965 | Alexander | ................ | B62B 1/12 280/47.24 |
| 3,430,972 A * | 3/1969 | Fiedler | ..................... | B62B 1/12 182/20 |
| 3,788,659 A * | 1/1974 | Allen | ....................... | B62B 1/12 280/47.27 |
| 4,235,449 A * | 11/1980 | Tarran | ...................... | E06C 1/397 280/30 |
| 4,253,546 A * | 3/1981 | Uchida | ..................... | B62B 1/12 182/20 |
| 4,448,440 A * | 5/1984 | Gier | .......................... | B62B 1/12 280/47.29 |
| 4,561,674 A * | 12/1985 | Alessio | ..................... | B62B 1/20 280/47.21 |
| 4,784,405 A * | 11/1988 | Stein | ........................ | B62B 1/12 280/47.29 |
| 5,072,958 A * | 12/1991 | Young | ....................... | B62B 1/12 280/40 |
| 5,096,265 A * | 3/1992 | Chang | ....................... | B62B 5/02 280/43.1 |
| 5,393,081 A * | 2/1995 | Mortenson | ............ | B60T 11/046 188/22 |
| 5,439,239 A * | 8/1995 | Su | .............................. | B62B 1/12 280/40 |
| 5,490,688 A * | 2/1996 | Cheng | ....................... | B62B 1/12 280/47.29 |
| 5,544,910 A * | 8/1996 | Esposito | ................... | B62B 1/12 280/47.29 |
| 5,564,720 A * | 10/1996 | Stringer | ................ | B62B 5/0023 224/153 |

(Continued)

*Primary Examiner* — Brodie Follman
*Assistant Examiner* — Brian Cassidy
(74) *Attorney, Agent, or Firm* — Alan D. Kamrath; Kamrath IP Lawfirm, P.A.

(57) ABSTRACT

A hand truck is provided with upper and lower frames; two hinges connecting the upper and lower frames; wheel assemblies connected to the lower frame; and a load support assembly connected to both the lower frame and the wheel assemblies to have an operative position extending forwardly of the lower frame. Each of the upper and lower frames includes two side rails each having two parallel frame members and a guide groove defined by the frame members. There are further provided an arcuate bar interconnected the hinges; and a lock assembly between the guide grooves of the side rails, the lock assembly including two opposite sliding members. The sliding member includes an insert section in the guide groove and having a first wing, a second wing opposite to the first wing, an extension extending out of the second wing, and a cavity.

10 Claims, 14 Drawing Sheets

(56) References Cited

U.S. PATENT DOCUMENTS

| | | | | |
|---|---|---|---|---|
| 5,626,352 A * | 5/1997 | Grace | ................. | B62B 1/12 280/47.29 |
| 6,302,983 B1 * | 10/2001 | Agren | ................. | B29C 57/02 156/273.7 |
| D475,167 S * | 5/2003 | Hailston | ................. | D34/27 |
| 6,601,859 B2 * | 8/2003 | Durham | ................. | B62B 1/12 280/47.131 |
| 6,616,174 B2 * | 9/2003 | Bierma | ................. | B62B 1/12 280/47.27 |
| 6,893,029 B2 * | 5/2005 | Hailston | ................. | B62B 1/10 280/47.27 |
| 7,445,231 B1 * | 11/2008 | Tsai | ................. | B62B 1/12 16/429 |
| 7,600,765 B2 * | 10/2009 | Tsai | ................. | B62B 1/002 280/47.18 |
| 8,100,417 B2 * | 1/2012 | Tsai | ................. | B62B 1/002 280/47.18 |
| 8,454,033 B2 * | 6/2013 | Tsai | ................. | B62B 1/002 280/47.18 |
| 9,233,700 B1 * | 1/2016 | Elden | ................. | B62B 1/12 |
| 2002/0067027 A1 * | 6/2002 | Anderson | ................. | A61G 12/001 280/655 |
| 2005/0023800 A1 * | 2/2005 | Cheng | ................. | B62B 1/042 280/652 |
| 2008/0197590 A1 * | 8/2008 | Tsai | ................. | B62B 1/002 180/47.18 |
| 2012/0049474 A1 * | 3/2012 | Del Rosario | ................. | B62B 1/008 280/47.34 |
| 2013/0328279 A1 * | 12/2013 | Feick | ................. | B62B 3/00 280/47.18 |

* cited by examiner

FOLDING HAND TRUCK

BACKGROUND OF THE INVENTION

1. Field of the Invention

The invention relates to hand trucks and more particularly to a folding hand truck with enhanced structural strength.

2. Description of Related Art

U.S. Pat. No. 6,601,859 discloses a vertically folding hand truck and methods of its operation and construction. The patent is characterized in that a dual wheel foldable hand truck with a nose plate has a skeletal frame including laterally spaced vertical side rails. The frame has hingedly connected upper and lower frame sections with upper and lower side rails meeting at side rail interfaces. Handle operated lock slides are carried by the upper rail sections for downward sliding movement to releasably lock the frame sections in planar alignment. The foldable nose automatically locks in operative position when swung down from stowed position.

However, the frame of the patent is not structurally strong. Thus, it may malfunction when an excessive load is carried by the hand truck.

Notwithstanding the prior art, the invention is neither taught nor rendered obvious thereby.

SUMMARY OF THE INVENTION

It is therefore one object of the invention to provide a hand truck comprising an upper frame; a lower frame; two hinges for connecting the upper frame to the lower frame; a pair of wheel assemblies connected to the lower frame to lie rearward of the lower frame; and a load support assembly connected to both the lower frame and the wheel assemblies to have an operative position extending forwardly of the lower frame; wherein the upper frame includes parallel first and second side rails; wherein the lower frame includes parallel third and fourth side rails; and wherein each of the first, second, third, and fourth side rails includes two parallel frame members and a guide groove defined by the frame members; further comprising an arcuate bar interconnected the hinges; and a lock assembly slidably disposed between the guide grooves of the first, second, third, and the fourth side rails, the lock assembly including two opposite sliding members and at least one brace each interconnecting the sliding members; wherein each of the sliding members includes an insert section disposed in the guide groove and having a first wing, a second wing opposite to the first wing, an extension extending out of the second wing, and a cavity defined by the insert section, the second wing, and the extension; wherein the extension is disposed externally of one of the first, second, third, and fourth side rails; and wherein each of the frame members is disposed in the cavity.

The above and other objects, features and advantages of the invention will become apparent from the following detailed description taken with the accompanying drawings.

DETAILED DESCRIPTION OF THE INVENTION

Referring to FIGS. 1 to 13, a folding hand truck in accordance with the invention comprises the following components as discussed in detail below.

An upper frame 1, a lower frame 2, two hinges 3 for connecting the upper frame 1 to the lower frame 2, a pair of wheel assemblies 4 connected to the lower frame 2 to lie rearward of the lower frame 2, a load support assembly 5 connected to both the lower frame 2 and the wheel assemblies 4 to have an operative position extending forwardly of the lower frame 2, and a lock assembly 6 slidably disposed between the hinges 3 are provided.

The upper frame 1 includes two parallel side rails 11, 12, a brace 13 interconnecting the side rails 11, 12, and a handle 14 interconnecting top ends of the side rails 11, 12. The lower frame 2 includes two parallel side rails 21, 22 and two braces 23 interconnecting the side rails 21, 22. Taking the rail 22 as an example, it has a H-shaped cross section and includes two parallel frame members 221, 222, an interconnection 223 formed with the frame members 221, 222, and a longitudinal guide groove 224 defined among the frame members 221, 222 and the interconnection 223.

The hinge 3 includes an upper member 31 secured to a lower portion of the side rail 11, and a lower member 32 secured to both an upper portion of the side rail 21 and the upper member 31, the lower member 32 being in lapping relationship to the upper member 31. An arcuate bar 33 is interconnected the opposite upper members 31 for increasing structural strength of the hinges 3. Taking the left wheel assembly 4 of FIG. 4 as an example, it includes a wheel mount 41 secured to both a lower portion of the side rail 22 and the load support assembly 5, and a wheel 42 rotatably secured to the wheel mount 41. An axle 43 is interconnected the wheel assemblies 4. Tow spaced risers 411 are formed on an inner surface of the wheel mount 41 and fitted on the interconnection 223.

The load support assembly 5 includes a platform 51 having a rectangular base 511 and a rear wall 512, two rear, spaced brackets 53 of L-shaped section, each bracket 53 secured to the rear wall 512 and having a lower hole 531 and an intermediate slot 532 with a notch 534 and an opening 533, two mount members 52 each having an upper hole 521, an intermediate slot member 522, and a lower shaft 523, a lock rod 54 having both ends passing through the notches 534 to moveably dispose in the slot member 522, and two torsion springs 55 each having a lower end put on one end of the lock rod 54. A fastener (not numbered) is driven through the other end of the spring 55, the upper hole 521, the side rail 22, and the riser 411 of the wheel mount 41 to fasten the spring 55, the mount member 52, the side rail 22, and the wheel mount 41 together. The shaft 523 is inserted through the lower hole 531 to secure the mount member 52 and the bracket 53 together by cooperating with a nut (not numbered). Another fastener (not numbered) is used to fasten the mount member 52, the side rail 22, and the wheel mount 41 together. In a locked (or inoperative) position, the lock rod 54 is retained in the notch 534 due to the compression of the spring 55.

The lock assembly 6 includes two opposite sliding members 61, 62, two braces 63 each interconnecting the sliding members 61, 62, and two positioning pins 64 each inserted through the sliding member 62 (or 61). Taking the sliding member 62 as example, it includes an insert section 620 disposed in the guide groove 224 and having a first arm 621, a second arm 622, and a link 623 interconnecting the first and second arms 621, 622, a first wing 624 adjacent to the first arm 621, a second wing 625 adjacent to the second arm 622, an extension 626 extending out of the second wing 625, and a cavity 627 defined by the second arm 622, the second wing 625, and the extension 626. The open ends of the first arm 621 (or the second arm 622) are curved in order to decrease friction with the guide groove 224. The frame member 222 is disposed in the cavity 727. The extension 626 is disposed externally of the side rail 22 and spaced from the hinge 3.

Figure 1:
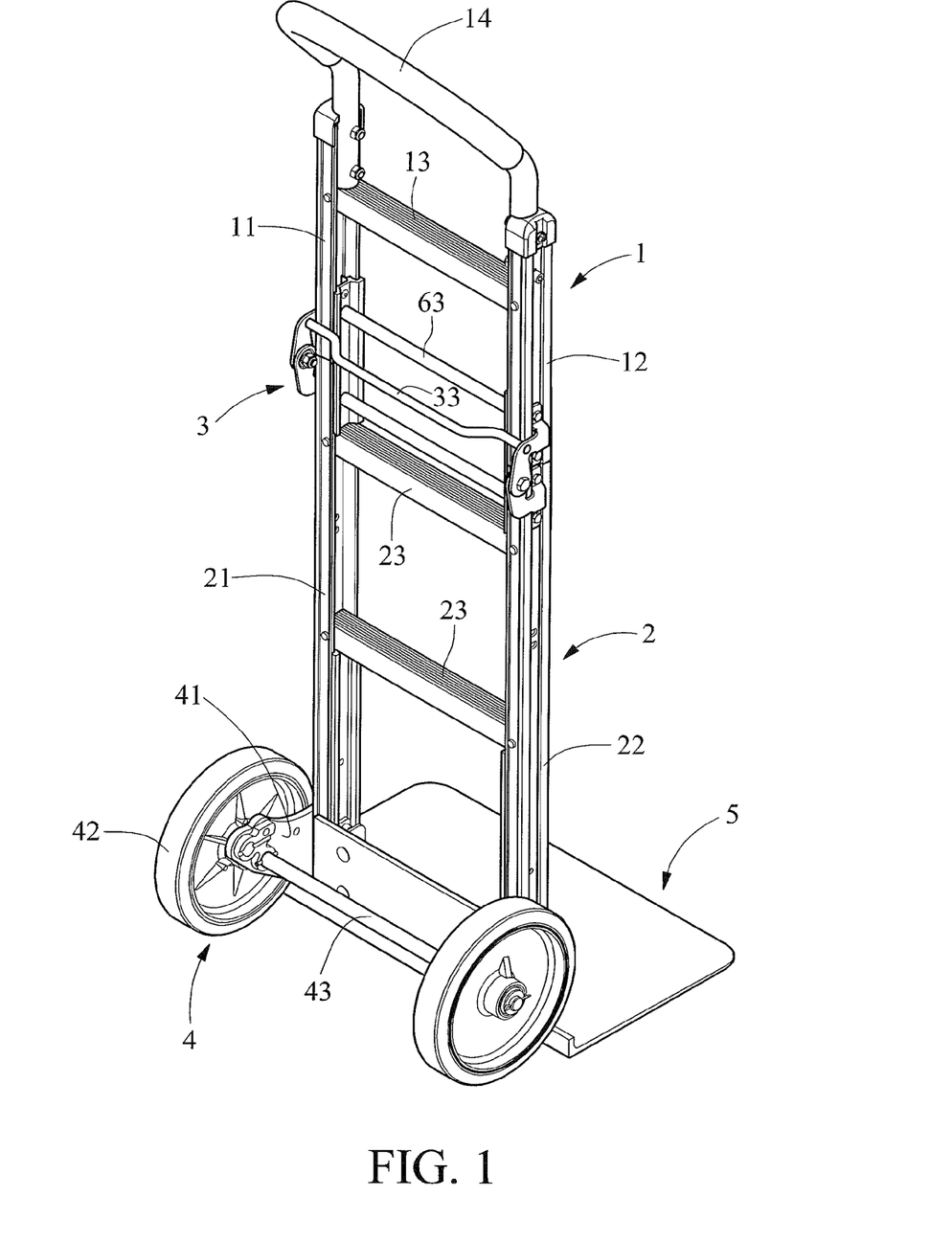
FIG. 1 is a perspective view of a folding hand truck according to the invention.
Figure 2:
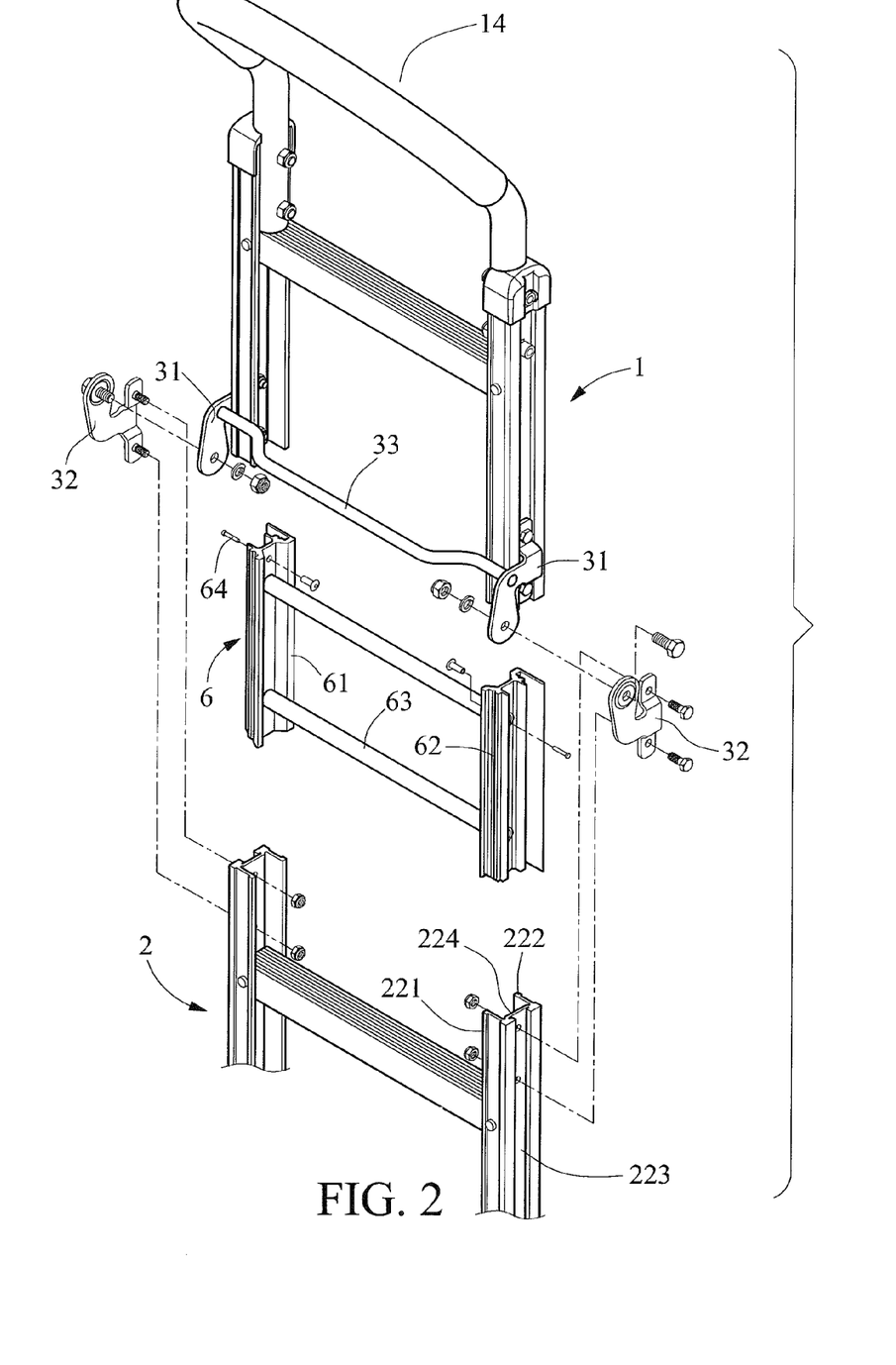
FIG. 2 is an exploded, perspective view of components shown in upper portion of FIG. 1.
Figure 3:
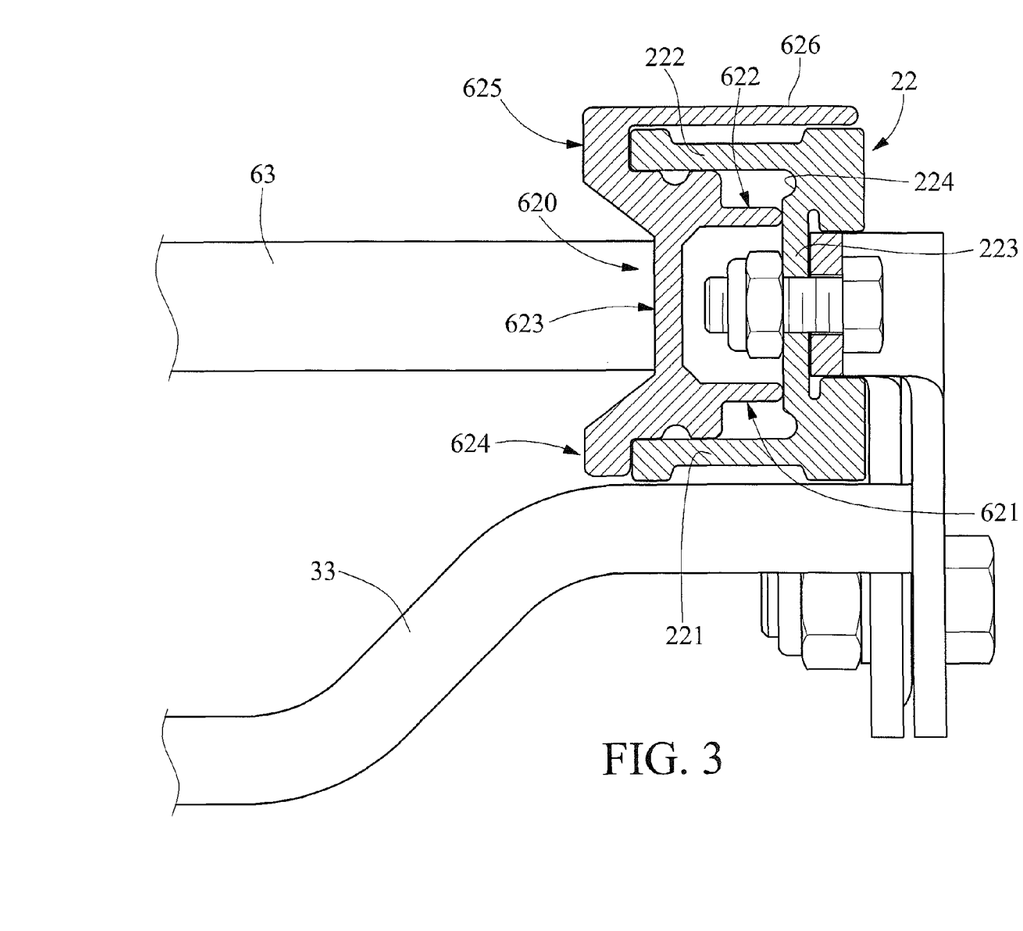
FIG. 3 is a longitudinal sectional view of either lock portion shown in FIG. 1.
Figure 4:
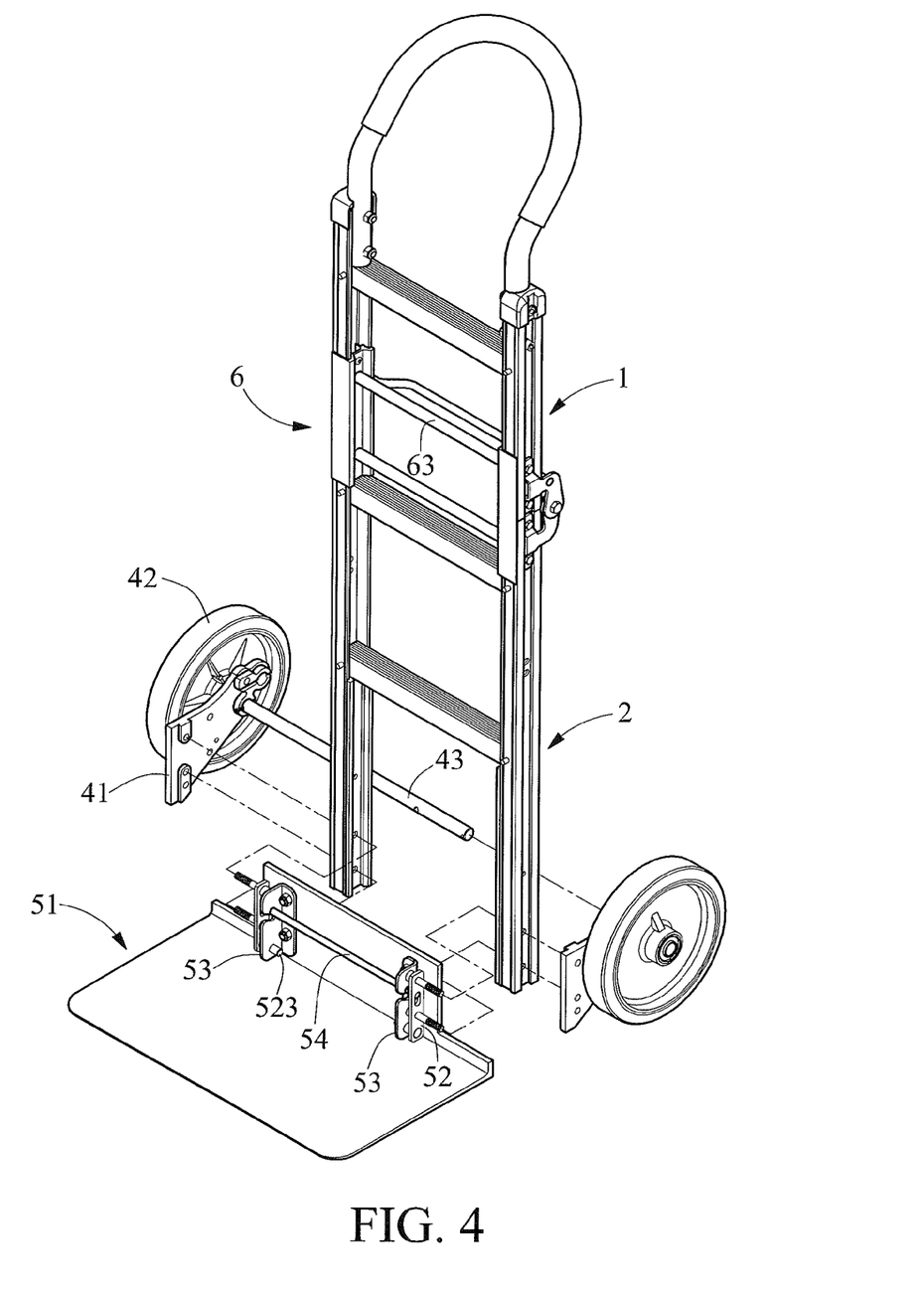
FIG. 4 is an exploded, perspective view of components shown in lower portion of FIG. 1.
Figure 5:
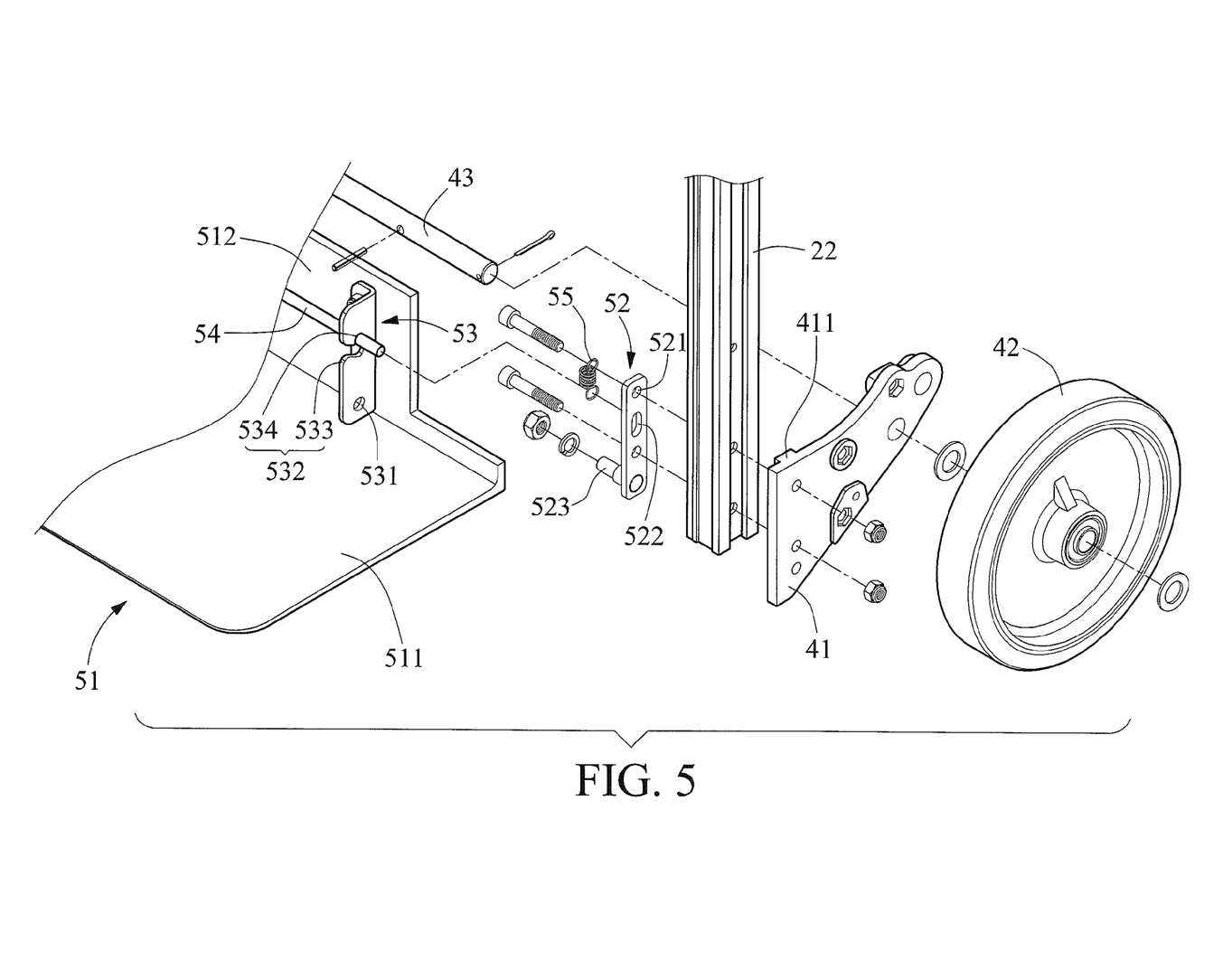
FIG. 5 is an exploded view of the wheel assembly and adjacent components shown in FIG. 4.
Figure 6:
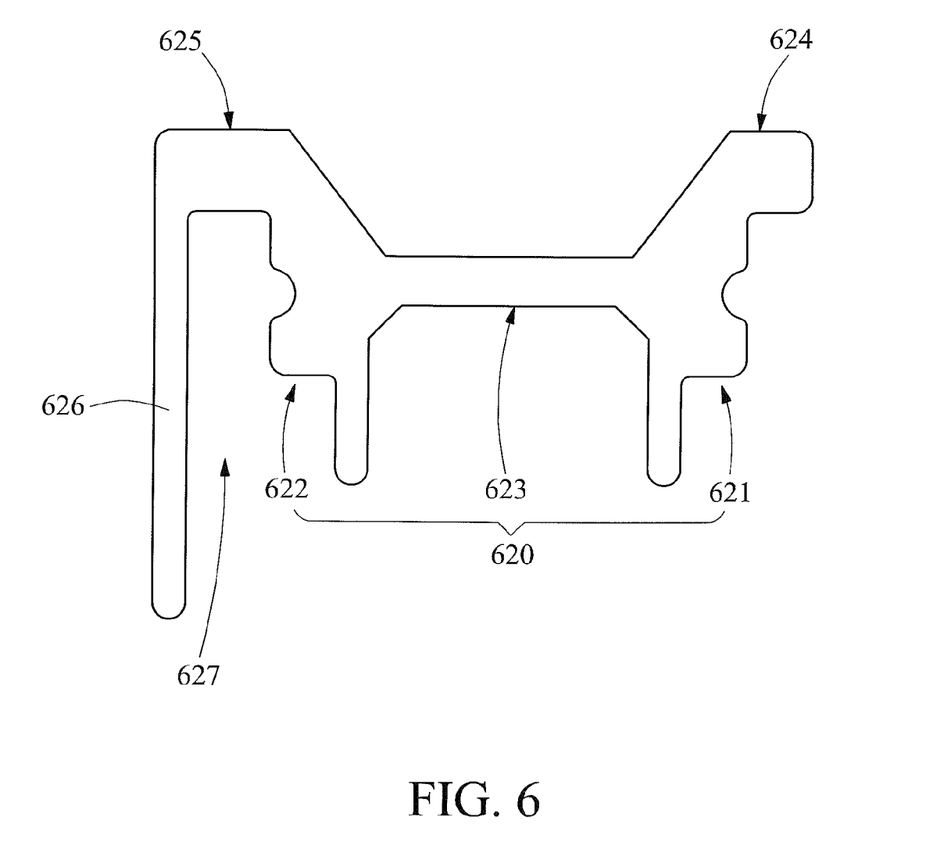
FIG. 6 is a front view of the insert section shown in FIG. 3.
Figure 7:
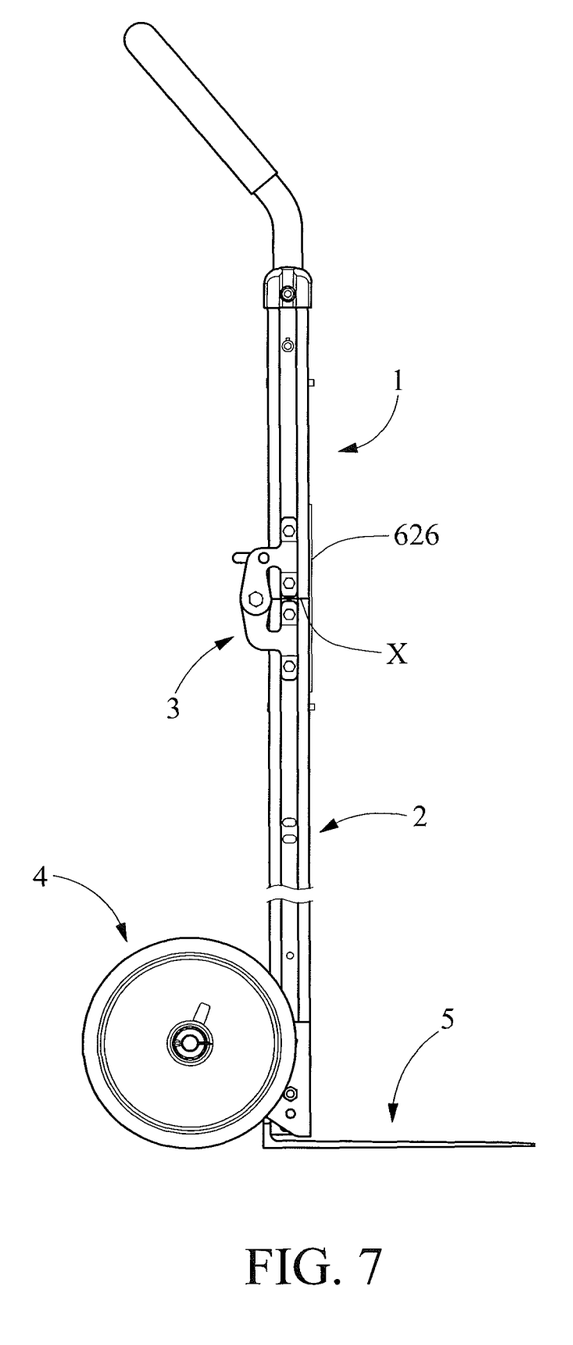
FIG. 7 is a side elevation of the hand truck of FIG. 1.
Figure 8:
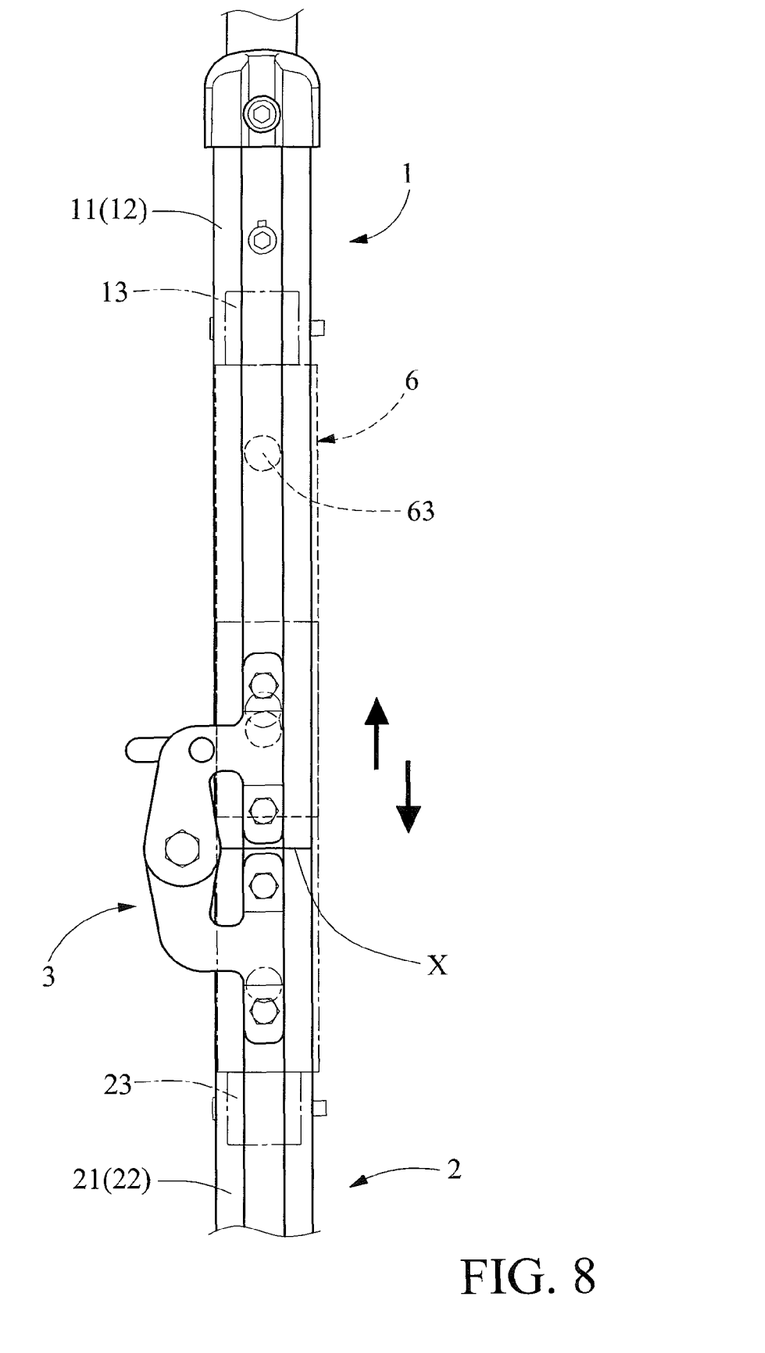
FIG. 8 is an enlarged view of the intermediate portion of FIG. 7 showing unlocking and locking operations.
Figure 9:
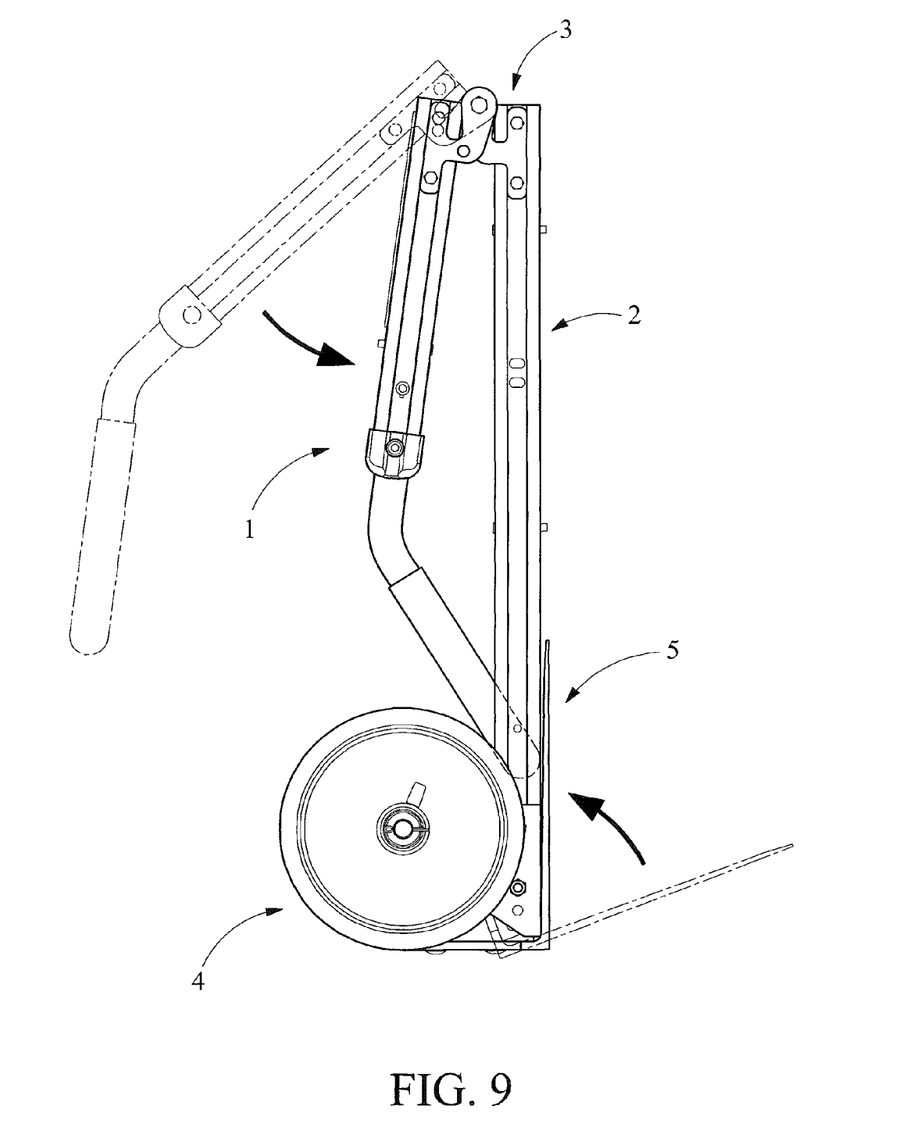
FIG. 9 is a view similar to FIG. 7 showing both the upper frame and # the load support assembly being counterclockwise rotated in a folding operation.
Figure 10:
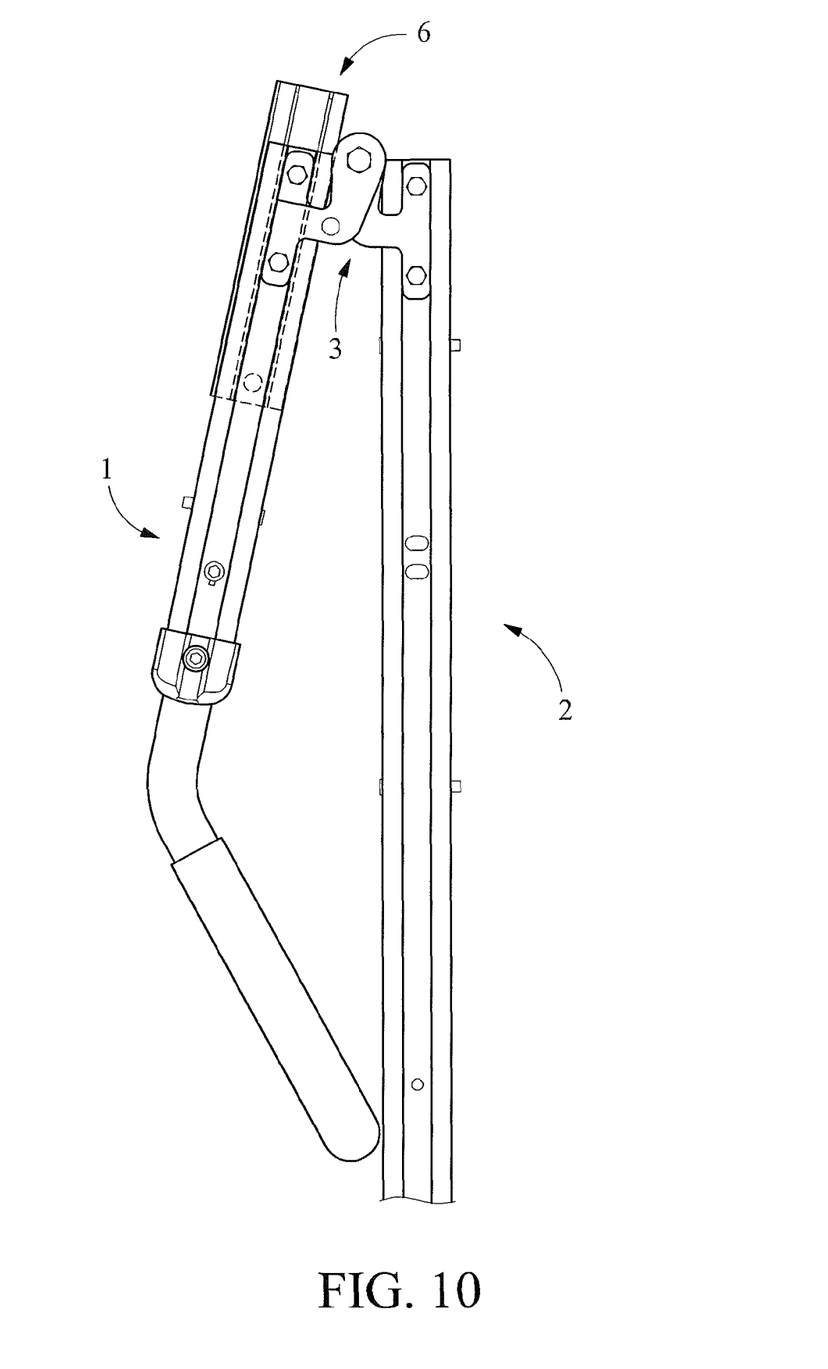
FIG. 10 is a side elevation showing the fully folding frame of FIG. 9.
Figure 10A:
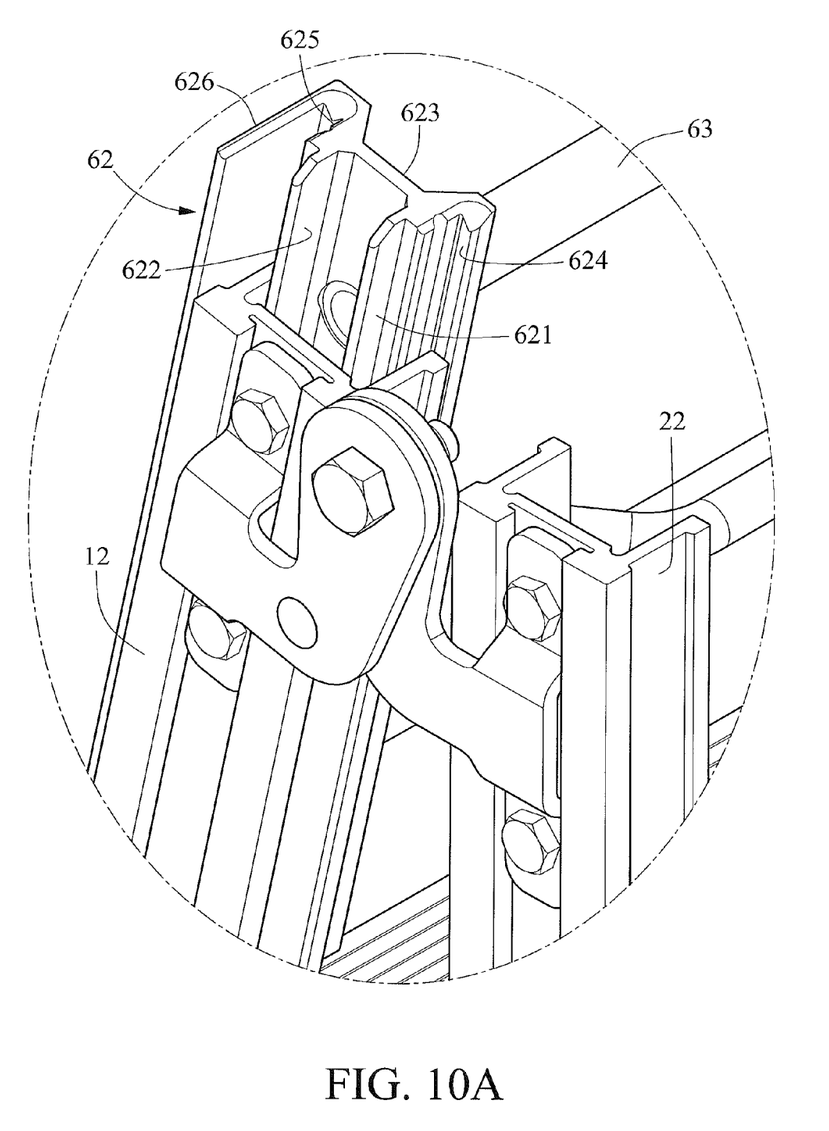
FIG. 10A is an enlarged, perspective view of the upper portion of FIG. 10.
Figure 11:
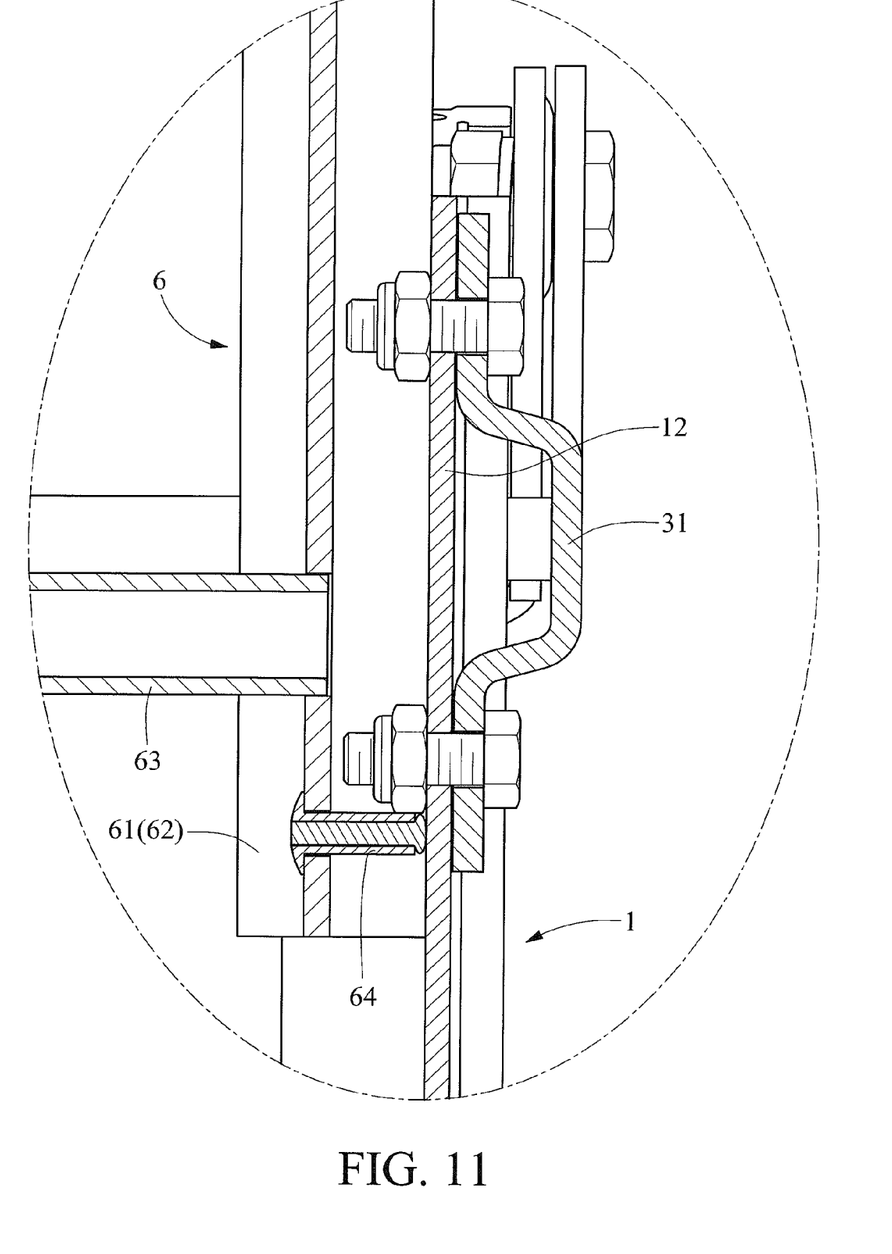
FIG. 11 is a longitudinal section view of the left portion of FIG. 10A.

Folding operation of the frame of the invention is described in detail below. A user may hold the brace 63 to lift the lock assembly 6. And in turn, the sliding members 61, 62 slide along the guide grooves 224 until the lock assembly 6 is lifted to a position above a joining portion (indicated by character "X" in FIG. 7) of the upper member 31 and the lower member 32. Next, the user may hold the handle 14 to counterclockwise pivot the upper frame 1 about the hinges 3. At the end of the pivotal movement, the upper frame 1 is disposed beside the lower frame 2, i.e., substantially parallel to each other (see FIG. 9). As shown in FIGS. 10, 10A, and 11, the positioning pins 64 also are urged against the hinges 3 to lock the lock assembly 6. A reverse operation of above steps can unlock the lock assembly 6 and unfold the upper frame 1 to dispose the hand truck in an operative position.

Figure 12:
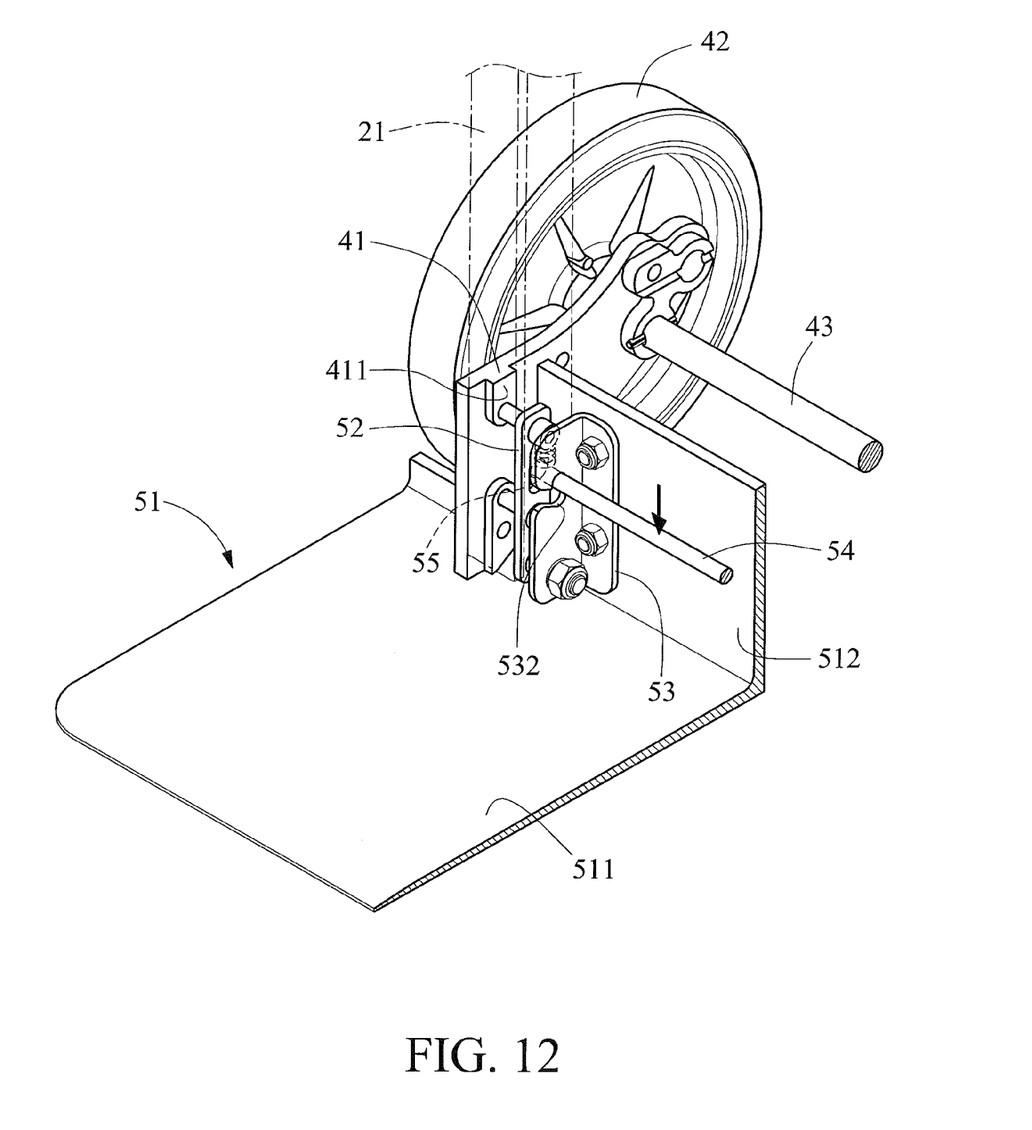
FIG. 12 is a fragmentary view of the wheel assembly and adjacent components of FIG. 1 showing a downward movement of the lock rod as a first step in the load support assembly folding operation.
Figure 13:
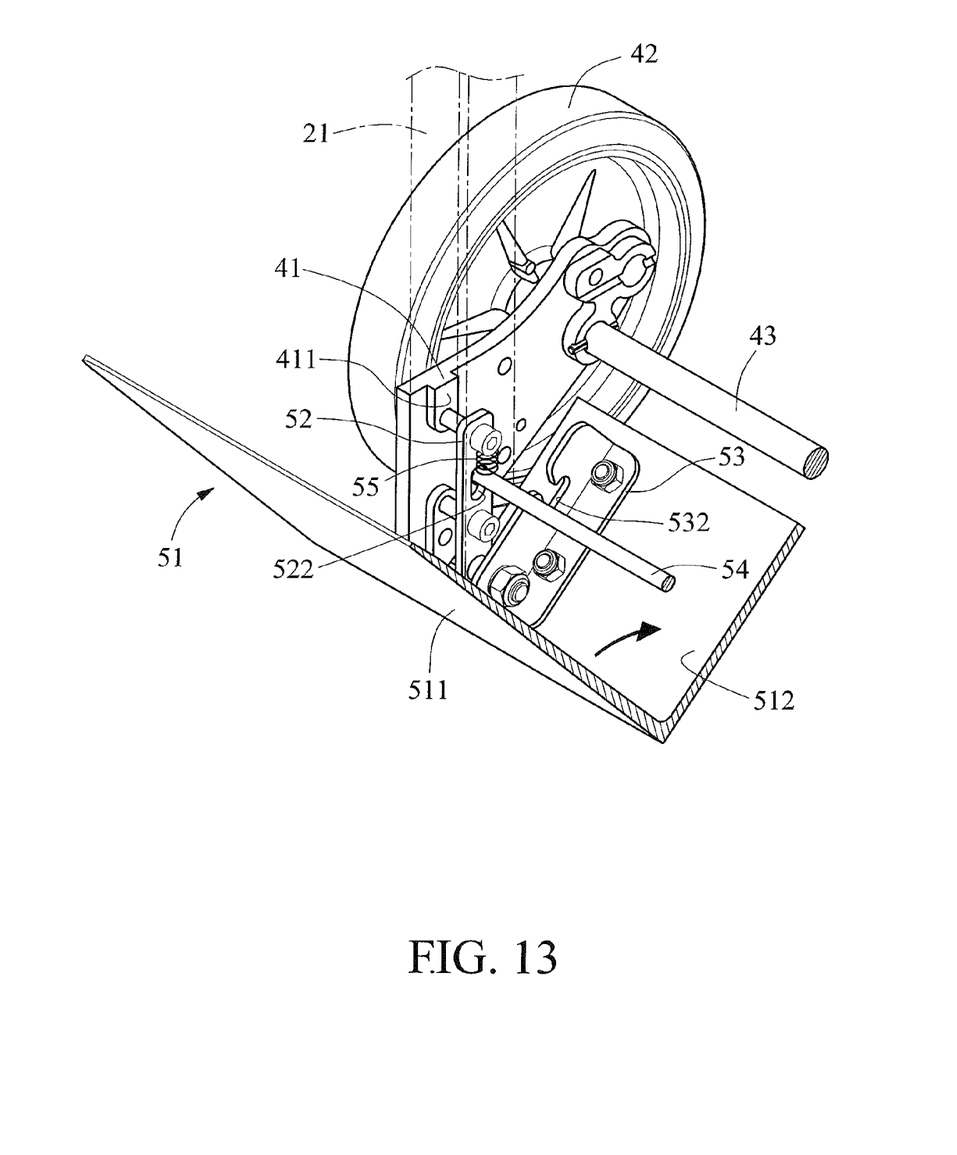
FIG. 13 is a view similar to FIG. 12 showing a clockwise rotation of the load support assembly as a subsequent step of the load support assembly folding operation.

Folding operation of the load support assembly 5 of the invention is described in detail below. As shown in FIGS. 12 and 13, the user may push down the lock rod 54 with the spring 55 being expanded until the lock rod 54 clears the notch 534 (i.e., the slot 532). Thus, the platform 51 is unlocked. Next, the user may pivot the platform 51 upward about the shaft 523 until being stopped. A reverse operation of above steps can unfold and lock the platform 51 to dispose the hand truck in an operative position.

While the invention has been described in terms of preferred embodiments, those skilled in the art will recognize that the invention can be practiced with modifications within the spirit and scope of the appended claims.

What is claimed is:

1. A hand truck comprising:
   an upper frame;
   a lower frame;
   two hinges for connecting the upper frame to the lower frame;
   a pair of wheel assemblies connected to the lower frame to lie rearward of the lower frame; and
   a load support assembly connected to both the lower frame and the wheel assemblies to have an operative position extending forwardly of the lower frame;
   wherein the upper frame includes parallel first and second side rails;
   wherein the lower frame includes parallel third and fourth side rails; and
   wherein each of the first, second, third, and fourth side rails includes two parallel frame members and a guide groove defined by the frame members;
   further comprising:
   an arcuate bar interconnected the hinges; and
   a lock assembly slidably disposed between the guide grooves of the first, second, third, and the fourth side rails, the lock assembly including two opposite sliding members and at least one brace each interconnecting the sliding members;
   wherein each of the sliding members includes an insert section disposed in the guide groove and having a first wing, a second wing opposite to the first wing, an extension extending out of the second wing, and a cavity defined by the insert section, the second wing, and the extension;
   wherein the extension is disposed externally of one of the first, second, third, and fourth side rails; and
   wherein each of the frame members is disposed in the cavity.

2. The hand truck of claim 1, wherein each of the wheel assemblies includes a wheel mount secured to both a lower portion of one of the third and fourth side rail and the load support assembly, and a wheel rotatably secured to the wheel mount.

3. The hand truck of claim 2, wherein the load support assembly includes a platform; two brackets each secured to the rear wall, two mount members each secured to one of the brackets and one of the third and fourth side rails; a lock rod passing through the brackets; and a plurality of biasing members each anchored between one of the mount members and the lock rod.

4. The hand truck of claim 3, wherein each of the brackets is of L-shaped section and has a base and a rear wall.

5. The hand truck of claim 4, wherein each of the mount members includes a plurality of hole members, a slot member with either end of the lock rod moveably disposed therein, and a shaft pivotably secured to one of the mount members.

6. The hand truck of claim 5, wherein each of the brackets includes a hole element with the shaft pivotably secured thereto, and a slot element with the lock rod moveably passing through.

7. The hand truck of claim 6, wherein the slot element includes an opening and a notch having an elevation greater than that of the opening, and wherein the lock rod is anchored in the notch in an inoperative position.

8. The hand truck of claim 7, wherein each of the sliding members further comprises a positioning pin configured to urge against one of the hinges at an end of a folding operation.

9. The hand truck of claim 8, wherein each of the first, second, third, and fourth side rails further comprises at least one interconnection formed with the frame members.

10. The hand truck of claim 9, further comprising an axle passing through the wheel mounts to secure to the wheels; wherein the insert section further comprises a first arm, a second arm, and a link interconnecting the first and second arms; and wherein open ends of each of the first and second arms are curved.

* * * * *